(12) United States Patent
Gotou

(10) Patent No.: US 6,684,970 B2
(45) Date of Patent: Feb. 3, 2004

(54) HYBRID SYSTEM FOR VEHICLE WITH 4WD START MODE

(75) Inventor: Kenichi Gotou, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/216,246

(22) Filed: Aug. 12, 2002

(65) Prior Publication Data

US 2003/0034188 A1 Feb. 20, 2003

(30) Foreign Application Priority Data

Aug. 13, 2001 (JP) ......................................... 2001-245173

(51) Int. Cl.⁷ ............................................... B60K 6/00
(52) U.S. Cl. ......................... 180/65.2; 180/243; 701/54
(58) Field of Search ................................ 180/65.2, 65.3, 180/65.4, 65.6, 65.7, 233, 242, 243; 701/69, 54

(56) References Cited

U.S. PATENT DOCUMENTS

| | | | | |
|---|---|---|---|---|
| 6,176,808 B1 | * | 1/2001 | Brown et al. .................... | 477/5 |
| 6,269,895 B1 | * | 8/2001 | Tanuguchi et al. .......... | 180/65.2 |
| 6,341,584 B1 | * | 1/2002 | Itoyama et al. ........... | 123/90.15 |
| 6,401,016 B1 | * | 6/2002 | Yoshino et al. ................ | 701/22 |
| 6,524,217 B1 | * | 2/2003 | Murakami et al. ............. | 477/5 |
| 2002/0023789 A1 | * | 2/2002 | Morisawa et al. ......... | 180/65.2 |

FOREIGN PATENT DOCUMENTS

| JP | 64--78937 | * | 3/1989 | ........... B60K/41/02 |
|---|---|---|---|---|

* cited by examiner

*Primary Examiner*—Avraham Lerner
(74) *Attorney, Agent, or Firm*—Foley & Lardner

(57) ABSTRACT

A hybrid system or a control method for a vehicle having a first set of road wheels and a second set of road wheels is disclosed. The system comprises an engine controller for receiving a torque request for an engine driving torque and combining an idle speed torque and the engine driving torque to generate an engine torque command signal. An engine, drivingly coupled with the first set of road wheels, applies a first driving torque to the first set of road wheels in response to the engine torque command signal. A hybrid controller is in communication with the engine controller. The hybrid controller generates the torque request and a motor torque command signal taking into account a creep torque portion of the first driving torque and a desired driving torque during starting the vehicle from standstill. A motor is drivingly coupled with the second set of road wheels. The motor applies a second driving torque to the second set of road wheels in response to the motor torque command signal.

26 Claims, 13 Drawing Sheets

HYBRID SYSTEM FOR VEHICLE WITH 4WD START MODE

BACKGROUND OF THE INVENTION

1. Field of the Invention

The present invention relates to a hybrid system for and a control method for a vehicle having a first set of road wheels and a second set of road wheels.

2. Description of the Background Art

Hybrid systems utilizing a motor/generator with an engine in moving a motor vehicle are proposed. During starting a vehicle from standstill, it is proposed to use two motors so as to move the vehicle in four-wheel drive mode. This control strategy is possible under condition where the state of charge (SOC) of a battery is high enough to provide overbalance supply of electric energy. However, it involves potential problem that smooth movement cannot be expected, due to uncontrollable torque variations, when the engine has to be started to charge the battery.

According an object of the present invention is to provide a hybrid system and a control method for a vehicle wherein the vehicle can be started from standstill smoothly without relying on two motors.

SUMMARY OF THE INVENTION

In accordance with an exemplary implementation of the present invention, a hybrid system for a vehicle having a first set of road wheels and a second set of road wheels is provided. The system comprises an engine controller for receiving a torque request for an engine driving torque and combining an idle speed torque and the engine driving torque to generate an engine torque command signal. An engine, drivingly coupled with the first set of road wheels, applies a first driving torque to the first set of road wheels in response to the engine torque command signal. A hybrid controller is in communication with the engine controller. The hybrid controller generates the torque request and a motor torque command signal taking into account a creep torque portion of the first driving torque and a desired driving torque during starting the vehicle from standstill. A motor is drivingly coupled with the second set of road wheels. The motor applies a second driving torque to the second set of road wheels in response to the motor torque command signal.

BRIEF DESCRIPTION OF THE DRAWINGS

Further objects and advantages of the invention will be apparent from reading of the following description in conjunction with the accompanying drawings.

DETAILED DESCRIPTION OF THE INVENTION

Figure 1:
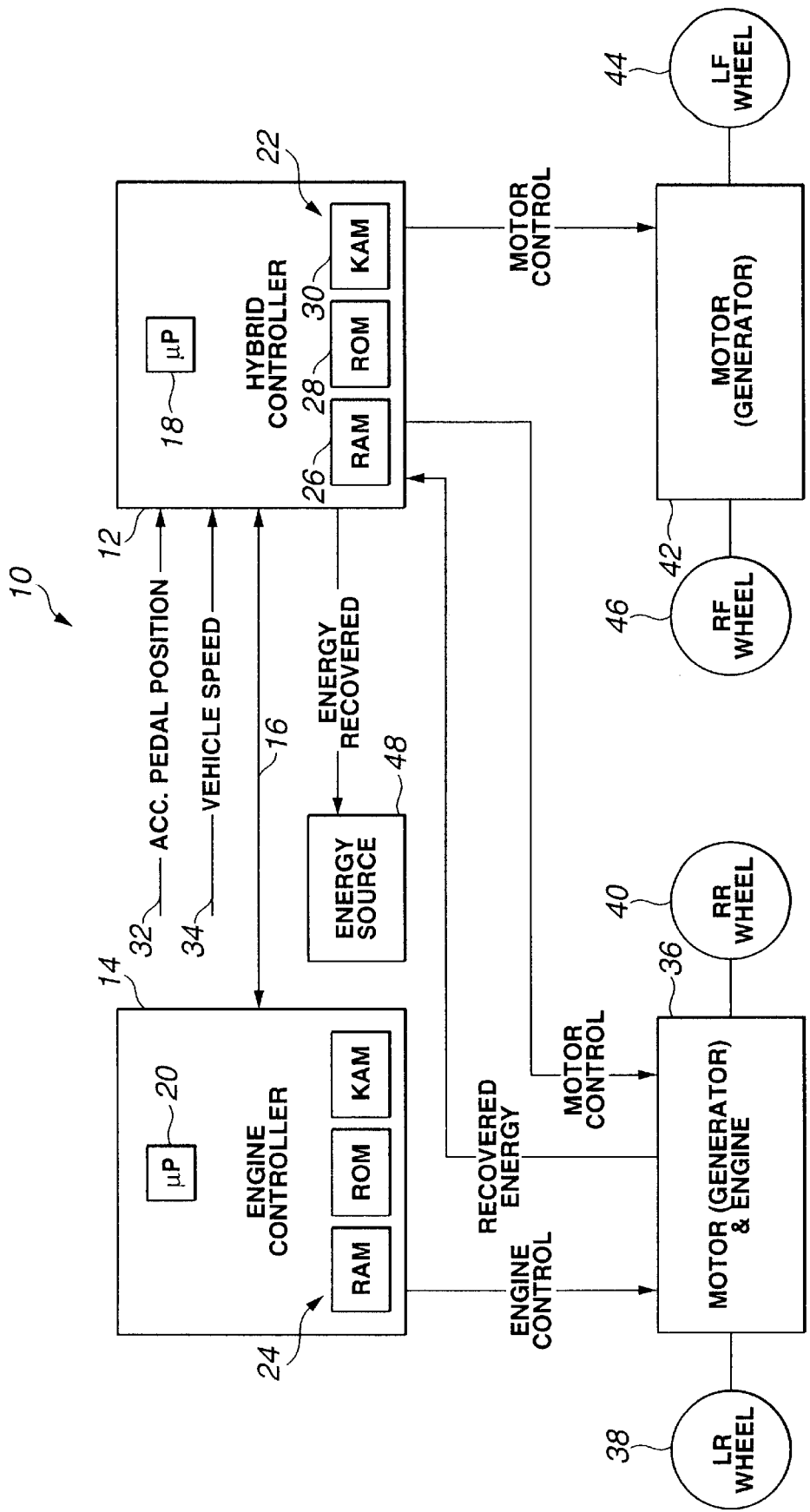
FIG. 1 is a block diagram illustrating a hybrid system for and a control method for a vehicle according to the present invention.

Referring now to the accompanying drawings, FIG. 1 shows a hybrid system for and a control method for a vehicle according to the present invention. System 10 includes a hybrid controller 12 in communication with an engine controller 14 via an appropriate communication link 16. Communication link 16 preferably conforms to an intra-controller bus standard, but is at least capable of exchanging information and commands relative to current operating conditions and control of the vehicle.

In one exemplary embodiment of the present invention, controllers 12 and 14 comprise microprocessor-based controllers with associated microprocessors 18 and 20, respectively. Microprocessors 18 and 20 communicate with associated computer-readable storage media 22 and 24, respectively. As will be appreciable by one of ordinary skill in the art, computer-readable storage media may include various devices for storing data representing instructions executable by the microprocessor to control the prime movers to power the drivetrain of the vehicle. For example, computer-readable storage media may include a random access memory (RAM) 26, a read-only memory (ROM) 28, and/or a keep-alive memory (KAM) 30. These functions may be performed through any one of a number of known physical devices including EPROM, EEPROM, flash memory, and the like. The present invention is not limited to a particular type of computer-readable storage medium, examples of which are provided for convenience of description only.

Controllers 12 and 14 are used to effect control logic implemented in terms of software (instructions) and/or hardware components. Additional details of control logic implemented by controllers 12 and 14 according to the present invention are provided with reference to FIGS. 5–13.

Controller 12 receives various signals from sensors to monitor current operating conditions of the vehicle. For example, signals may include an accelerator pedal position signal 32 and a vehicle speed signal 34. Controller 12 may be in direct communication with associated sensors, switches, and other input devices, or may receive information relative to sensed parameters via another controller, such as controller 14. Likewise, controller 14 may be in direct communication with associated sensors, switches, and other input devices, or may receive information relative to sensed parameters via another controller, such as controller 12.

System 10 determines whether or not there is an engine-idle request for an idle speed torque to produce an engine-creep torque. In addition to this request, controller 14 receives a torque request for an engine driving torque vRTRQe from controller 12. Controller 14 combines the idle speed torque and engine driving torque vRTRQe to generate an engine torque command signal. As a part of engine control, controller 14 applies the engine torque command signal to an engine of a motor and engine assembly 36. The engine is drivingly coupled with a first set of road wheels 38 and 40 to apply a first driving torque to first set of road wheels 38 and 40 in response to the engine torque command signal. As will be appreciable by one of ordinal skill in the art, first set of road wheels 38 and 40 are subject to creep torque due to the idle speed torque derived from the engine. Under this condition, a desired driving torque tTRQ1 is zero, but the creep torque causes the vehicle to move.

System 10 determines desired driving torque tTRQ1 versus a current operator demand and vehicle speed condition. It determines operator demand as represented by an accelerator pedal position APO indicated by accelerator pedal position signal 32 and an actual vehicle speed VSP from vehicle speed signal 34. Controller 12 may make such determinations to obtain desired driving torque tTRQ1 or may receive such information via controller 14.

System 10 determines whether there is a 4WD-start request. Such request may be made via an input device manipulated by vehicle operator. Under this condition, as the operator steps on the accelerator pedal, controller 12 generates the torque request and a motor torque command signal taking into account a creep torque portion CREEP_TRQ of the first driving torque applied to road wheels 38 and 40 during starting the vehicle from a standstill. As a part of motor control, controller 12 applies the motor torque command signal to a motor/generator 42.

Motor/generator 42 is drivingly coupled with a second set of road wheels 44 and 46 to apply a second driving torque to road wheels 44 and 46 in response to the motor torque command signal. An energy source 48 supplies electric energy through controller 12 to motor/generator 42. Energy source 48 supplies electric energy through controller 12 to a motor/generator of motor and engine assembly 36, too, when additional driving torque is required. The motor/generator of assembly 36 supplies electric energy through controller 12 to energy source 48 in regenerative mode.

In applications where controller 14 controls an engine that drives front road wheels of a vehicle, the first set of road wheels are a pair of front road wheels and the second set of road wheels are a pair of rear road wheels. In applications where controller 14 controls an engine that drives rear road wheels of a vehicle, the first set of road wheels are a pair of rear road wheels and the second set of road wheels are a pair of front road wheels.

Figure 2:
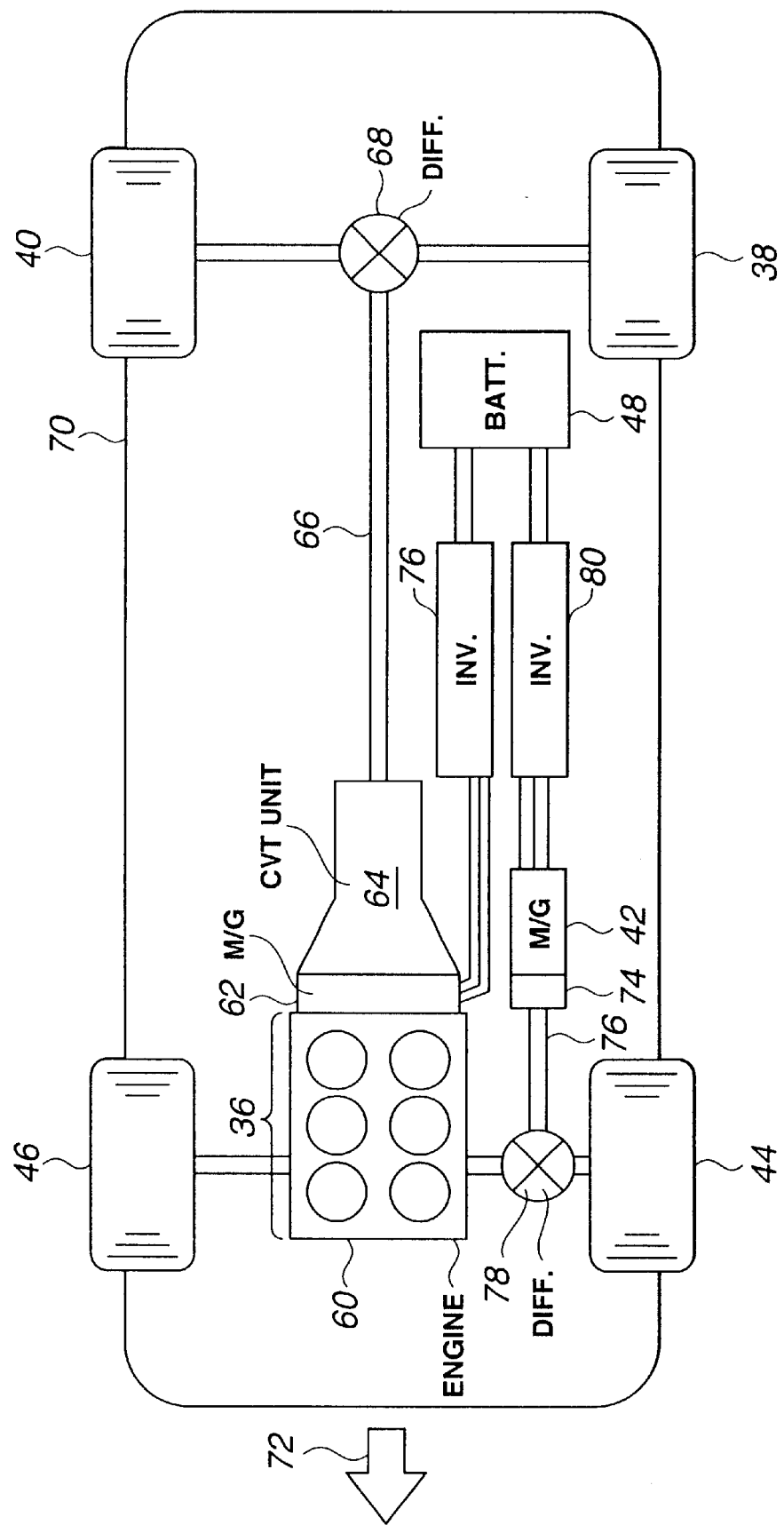
FIG. 2 is a block diagram illustrating a drivetrain for one embodiment in a vehicle having a set of front road wheels and a set of rear road wheels.

Referring to FIG. 2, in one exemplary embodiment of the present invention, the first set of road wheels are a left rear road wheel 38 and a right rear road wheel 40, and the second set of road wheels are a left front road wheel 44 and a right front road wheel 46. In the embodiment, a motor and engine assembly 36 includes an internal combustion engine 60 and a motor/generator 62. A throttle controls the torque output of engine 60. Engine 60 outputs its power through the engine output shaft, with which motor/generator 62 is directly coupled. Motor/generator 62 may be indirectly coupled with the engine output shaft via a power transmission member such as a belt or a chain. The engine output shaft is connected to a pump shaft of a hydrokinetic unit in the form of a torque converter, which has a turbine shaft connected to an input shaft of a continuously variable transmission (CVT). The CVT transfers the engine power to the CVT output shaft. In the embodiment, the torque converter and CVT are assembled as a CVT unit 64. The torque converter needs not be positioned between the engine output shaft and the CVT input shaft. It may be positioned after the CVT output shaft. The CVT output shaft transfers via a drive shaft 66 the engine power to a final drive, which includes a differential 68. The final drive moves a vehicle 70 in a forward direction as indicated by an arrow 72 by rotating rear road wheels 38 and 40. In the embodiment, motor and engine assembly 36 can move vehicle 70 in a reverse direction by conditioning a forward/reverse changeover mechanism of CVT unit 64 into a reverse position.

In the embodiment, electric power controls the torque output of a motor/generator 42, which outputs its power through the motor output shaft. The motor output shaft is connected to a reduction gearing 74. Reduction gearing 74 transfers the motor power via a drive shaft 76 to a final drive, which includes a differential 78. This final drive moves the vehicle 70 by rotating front road wheels 44 and 46.

In the embodiment, an energy source 48 is in the form of a battery. Battery 48 supplies electric energy through an inverter 80 to motor/generator 42. Battery 48 supplies electric energy through another inverter 82 to motor/generator 62 of motor and engine assembly 36, too, when additional driving torque is required. Motor/generator 62 supplies electric energy through inverter 82 to energy source 48 in regenerative mode. Supply of electric energy through inverter 80 or 82 is under the control of a hybrid controller 12, which will be described later in connection with FIG. 7.

Figure 3:
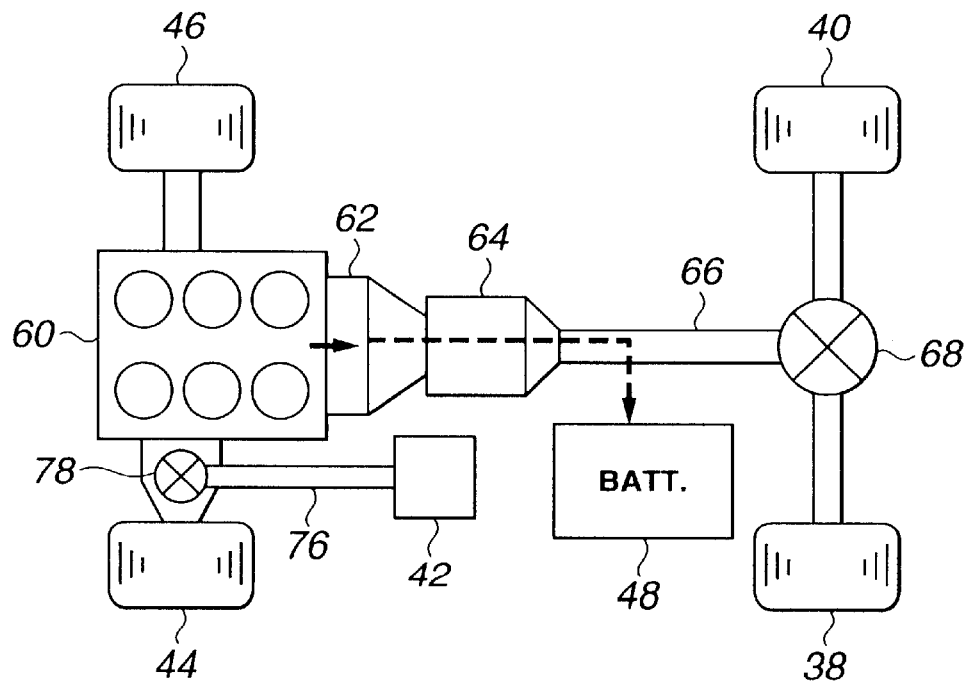
FIG. 3 is a simplified block diagram of FIG. 2 illustrating a case where an engine of a motor and engine assembly outputs additional power needed for a motor/generator of the assembly to supply electric energy to an energy source in the form of a battery when a vehicle is moving due to creep torque by the engine.
Figure 4:
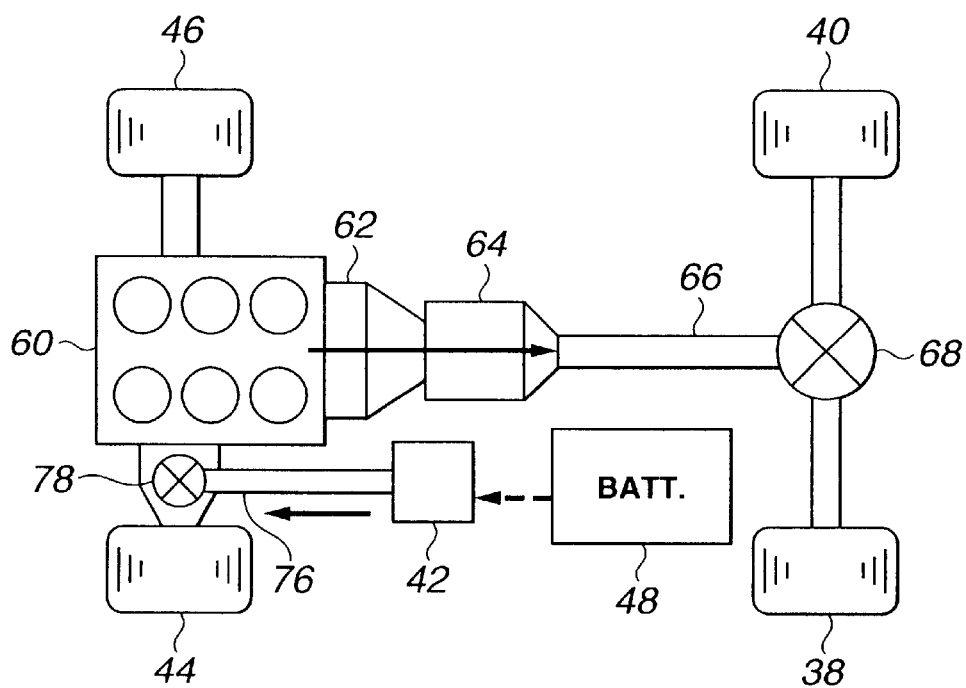
FIG. 4 is a similar view to FIG. 3 illustrating another case where the battery supplies electric energy to a motor/generator for application of another driving torque to front road wheels as the engine applies its driving torque to rear road wheels in four-wheel drive (4-WD) mode during starting the vehicle from a standstill.

Referring to FIGS. 3 and 4, FIG. 3 illustrates a case where engine 60 outputs additional power needed for motor/generator 62 to supply electric energy to battery 48 when the vehicle is moving due to creep torque by engine 60. This is the case when battery 48 needs electric energy to lift its SOC. Normally, motor/generator 62 does not operate when vehicle 70 is moving due to creep torque by engine 60. FIG. 4 illustrates another case where battery 48 supplies electric energy to motor/generator 42 for application of another driving torque to front road wheels 44 and 46 in four-wheel drive (4WD) mode during starting the vehicle from a standstill. In FIGS. 3 and 4, the fully drawn arrows indicate torque, and the dotted arrows indicate electric energy.

As shown in FIG. 3, in the embodiment according to the present invention, engine 60 idles to apply creep torque to first set of road wheels 38 and 40 allowing vehicle 70 to move or creep. The use of engine 60 to produce creep torque is advantageous over the use of motor/generator 62 for suppressing a drop in SOC of battery 48. This advantage is vivid during starting the vehicle from a standstill in conformity with a predetermined schedule set by 4WD-start request.

For starting the vehicle, what operator has to do is to step on the accelerator pedal. In the embodiment, the operator expresses his/her power demand by depressing the accelerator pedal. Such operator demand is monitored by system 10 through APO. A desired driving torque tTRQ1 varies with different VSP and APO conditions. System 10 determines desired driving torque tTRQ1 for current VSP and APO condition. When desired driving torque tTRQ1 is not greater than creep torque CREEP_TRQ, first driving torque applied by engine 60 to first set of road wheels 38 and 40 is creep torque CREEP_TRQ and second driving torque applied by motor/generator 42 to second set of road wheels 44 and 46 is zero. Under this condition, the creep torque CREEP_TRQ may be regarded as a desired driving torque instead of the desired driving torque tTRQ1 that has been determined.

Subsequently, desired driving torque tTRQ1 exceeds creep torque CREEP_TRQ and increases further. Immediately after desired driving torque tTRQ1 has exceeded creep torque CREEP_TRQ, vehicle 70 shifts from 2WD creep mode to 4WD mode. To accomplish this shift smoothly, system 10 regulates motor/generator 42 in such a manner to increase a motor driving torque vFTRQ, while allowing engine 60 to keep producing creep torque CREEP_TRQ. Motor driving torque vFTRQ is applied, as second driving torque, to second set of road wheels 44 and 46. Creep torque CREEP_TRQ only is applied, as first driving torque, to first set of road wheels 38 and 40. Specifically, motor driving torque vFTRQ increases from zero in proportional relationship to desired driving torque tTRQ1. Such increase in second or motor driving torque vFTRQ with first driving torque kept as high as creep torque CREEP_TRQ causes a four-wheel drive rate 4WD_RATE to drop from 100% toward a settable target level of, for example, 50% (=½). In the embodiment, the system 10 monitors whether 4WD_RATE of 50% has been accomplished and keeps on increasing motor driving torque vFTRQ until 4WD_RATE of 50% will be accomplished. When accomplished, motor driving torque vFTRQ matches creep torque CREEP_TRQ.

In the embodiment, 4WD_RATE is given as a torque ratio that may be expressed as, $$[\text{TORQUE RATIO}] = [\text{FIRST DRIVING TORQUE}]/[tTRQ1] \times 100 \quad (1).$$

There are various examples of the manner of such monitoring of 4WD_RATE. One example is comparing the excess of desired driving torque tTRQ1 over creep torque CREEP_TRQ to creep torque CREEP_TRQ. In this case, system 10 determines that the 4WD_RATE of 50% is accomplished when the excess of desired driving torque tTRQ1 matches creep torque CREEP_TRQ or when desired driving torque tTRQ1 exceeds CREEP_TRQ by at least an amount corresponding to creep torque CREEP_TRQ. Another example is comparing the estimate or measure of the second driving torque vFTRQ to creep torque CREEP_TRQ. In this case, system 10 determines that the 4WD_RATE of 50% is accomplished when the estimate or measure of the second driving torque vFTRQ matches creep torque CREEP_TRQ. Other example is establishing a threshold as a function of CREEP_TRQ and a target level of 4WD_RATE and comparing desired driving torque tTRQ1 to the threshold. The threshold can be expressed as, $$[\text{Threshold}] = [CREEP\_TRQ] \times 100 \div [\text{Target level of } 4WD\_RATE] \quad (2).$$

In this case, system 10 determines that the target level of 4WD_RATE has been accomplished when desired driving torque tTRQ1 exceeds the threshold.

Immediately after the motor driving torque vFTRQ has matched a predetermined relationship with creep torque CREEP_TRQ, system 10 performs an appropriate distribution of desired driving torque tTRQ1 between first driving torque applied to first set of road wheels 38 and 40 and second driving torque applied to second set of road wheels 44 and 46. In the embodiment, for even distribution to accomplish the target level of 4WD_RATE (=50%), system 10 calculates one half of desired driving torque tTRQ1 to give motor driving torque vFTRQ and calculates the subtract of motor driving torque vFTRQ from the excess of target driving torque over creep torque CREEP_TRQ to give a driving torque vRTRQ. If assist by motor/generator 62 is not required, the sum of this driving torque vRTRQ and creep torque CREEP_TRQ gives first driving torque applied to first set of road wheels 38 and 40. Controller 14 receives torque request for the driving torque and combines it and idle speed torque to generate an engine torque command signal. In response to the engine torque command signal, engine 60 applies the sum of driving torque vRTRQ and creep torque CREEP_TRQ, as first driving torque, to first set of road wheels 38 and 40. Because the use of motor/generator 42 only suppresses a drop in SOC of battery 48, the control strategy can accomplish four-wheel drive when there is little overabundance supply of electric energy. When there is overabundance supply of electric energy, using both of motor/generators 42 and 62, four-wheel drive may be accomplished without relying on engine 60.

Figure 5:
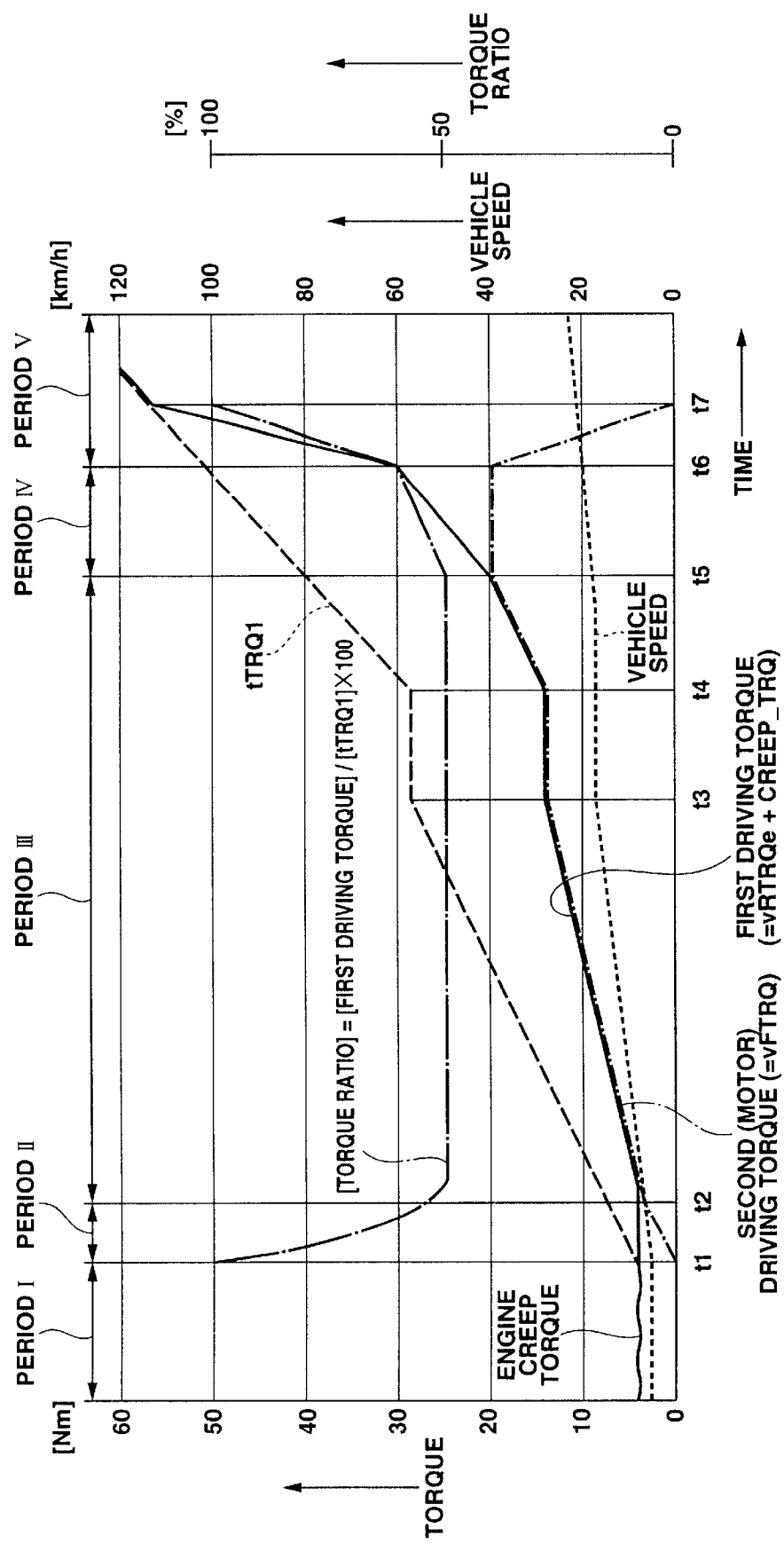
FIG. 5 is a graphical representation illustrating a control strategy implementing the present invention.

Referring now to FIG. 5, the control strategy is specifically described the illustrated. The control strategy may be divided into five phases or periods, namely, periods I, II, III, IV and V.

Period I (up to immediately before t1):

The vehicle is subject to creep torque CREEP_TRQ only, which is applied to first set of road wheels 38 and 40. Under this condition, system 10 determines that desired driving torque tTRQ1 is zero because APO is zero. However, system 10 sets or uses creep torque CREEP_TRQ as desired driving torque tTRQ1 under this condition for calculating the equation (1). Accordingly, system 10 determines that 4WD_RATE is 100% after calculating the equation (1) with desired driving torque tTRQ1 kept equal to creep torque CREEP_TRQ.

Period II (from t1 inclusive to immediately before t2):

It is assumed that, at moment t1, operator steps on the accelerator pedal to provide such an increase in APO as to cause desired driving torque tTRQ1 to exceed creep torque CREEP_TRQ. It is also assumed that immediately after the moment t1, desired driving torque tTRQ1 increases as indicated by the broken line.

At moment t1, system 10 determines that desired driving torque TRQ1 has exceeded creep torque CREEP_TRQ and initiates a shift from 2WD creep mode to 4WD mode. As mentioned before, to accomplish this shift smoothly, system 10 regulates motor/generator 42 in such a manner as to increase motor driving torque vFTRQ from zero in proportional relationship to desired driving torque vFTRQ while allowing engine 60 to produce creep torque CREEP_TRQ only. Such increase in second or motor driving torque vFTRQ with first driving torque kept as high as creep torque CREEP_TRQ causes 4WD_RATE to drop from 100% toward a settable target level of, for example, 50% (=½). Motor driving torque vFTRQ increases until it reaches a level as high as creep torque CREEP_TRQ. In FIG. 5, at moment t2, system 10 determines that motor driving torque vFTRQ has reached the level as high as creep torque CREEP_TRQ. This is the moment when the target level 50% of 4WD_RATE, has been accomplished. In the embodiment, system 10 determines that the target level of 4WD_RATE has been accomplished when desired driving torque tTRQ1 exceeds the threshold as expressed by the formula (2).

The illustrated example is based on the assumption that desired driving torque tTRQ1 exceeds creep torque CREEP_TRQ upon operator stepping on the accelerator pedal. However, there is the case when desired driving torque tTRQ1 does not exceed creep torque CREEP_TRQ upon or immediately after operator stepping on the accelerator pedal. In this case, system 10 sets or uses creep torque CREEP_TRQ as desired driving torque tTRQ1 for smooth shift from creep mode to 4WD mode.

Period III (from moment t2 to immediately before moment t5):

Immediately after moment t2, system 10 distributes desired driving torque tTRQ1 in two fragments, one for first driving torque applied to first set of road wheels 38 and 40, the other for second driving torque applied to second set of road wheels 44 and 46. In the embodiment, for even distribution to accomplish the target level 50% of 4WD_RATE, system 10 calculates one half of desired driving torque tTRQ1 to give motor driving torque vFTRQ. It also calculates the subtract of motor driving torque vFTRQ from the excess of target driving torque over creep torque CREEP_TRQ to give a driving torque vRTRQ. Motor driving torque vFTRQ is second driving torque applied to second set of road wheels 44 and 46. If assist by motor/generator 62 is not required, the sum of the driving torque vRTRQ and creep torque CREEP_TRQ is first driving torque applied to first set of road wheels 38 and 40. Controller 14 receives torque request for the driving torque and combines it and idle speed torque to generate an engine torque command signal. In response to the engine torque command, engine 60 applies the first driving toque to first set of road wheels 38 and 40. In FIG. 5, the fully drawn line indicates first driving torque and the one-dot chain line indicates second driving torque. As illustrated, until immediately before moment t5, first and second driving torques increase in the same manner at one half the rate at which desired driving torque tTRQ1 increases.

Period IV (from moment t5 inclusive to immediately before moment t6):

At moment t5, system 10 determines that motor driving torque vFTRQ has reached an upper limit U_LIMIT of, for example, 20 Nm. After moment t5 and till immediately before moment t6, motor driving torque vFTRQ is kept as high as this upper limit U_LIMIT. Since motor driving torque vFTRQ is limited, first driving torque increases at the same rate as desired driving torque tTRQ1 increases. As driving torques applied to road wheels 38, 40, 42 and 44 increase, vehicle is accelerated. Accordingly, vehicle speed VSP increases as indicated by the broken line.

The upper limit U_LIMIT is determined taking into account the conversion efficiency of motor/generator 42 from electric energy to mechanical energy. In the embodiment, a torque of 20 Nm is set as upper limit U_LIMIT. This is because, if used to do work exceeding this upper limit, the temperature of motor/generator 42 becomes high and the conversion efficiency from electric power input to torque output drops. Such drop in the conversion efficiency causes a drop in fuel economy. During this period IV, 4WD_RATE increases from 50% as indicated by the one-dot chain line.

Period V (from moment t6 inclusive to moment t7):

At moment t6, system 10 determines that vehicle speed VSP has reached a predetermined upper limit speed, which is 20 km/h in the embodiment. After moment t6, system 10 regulates motor/generator 42 in such a manner as to reduce motor driving torque vFTRQ to zero. In response to this reduction in motor driving torque vFTRQ, system 10 regulates engine 60 in such a manner as to increase first driving torque toward a level as high as desired target driving torque tTRQ1. At moment t7, motor driving torque vFTRQ becomes zero and first driving torque becomes as high as desired driving torque tTRQ1. At moment t7, 4WD_RATE becomes 100%, completing a shift from 4WD mode to 2WD mode.

It is experimentally confirmed that, by the time vehicle speed reaches 20 km/h, the vehicle would be accelerated enough by motor/generator 42. It is also confirmed that the conversion efficiency from electric input to torque output considerably drops when motor/generator 42 continues to operate beyond this vehicle speed. In the embodiment, system 10 uses 20 km/h as the predetermined upper limit speed accounting for the experimentally confirmed facts.

Figure 6:
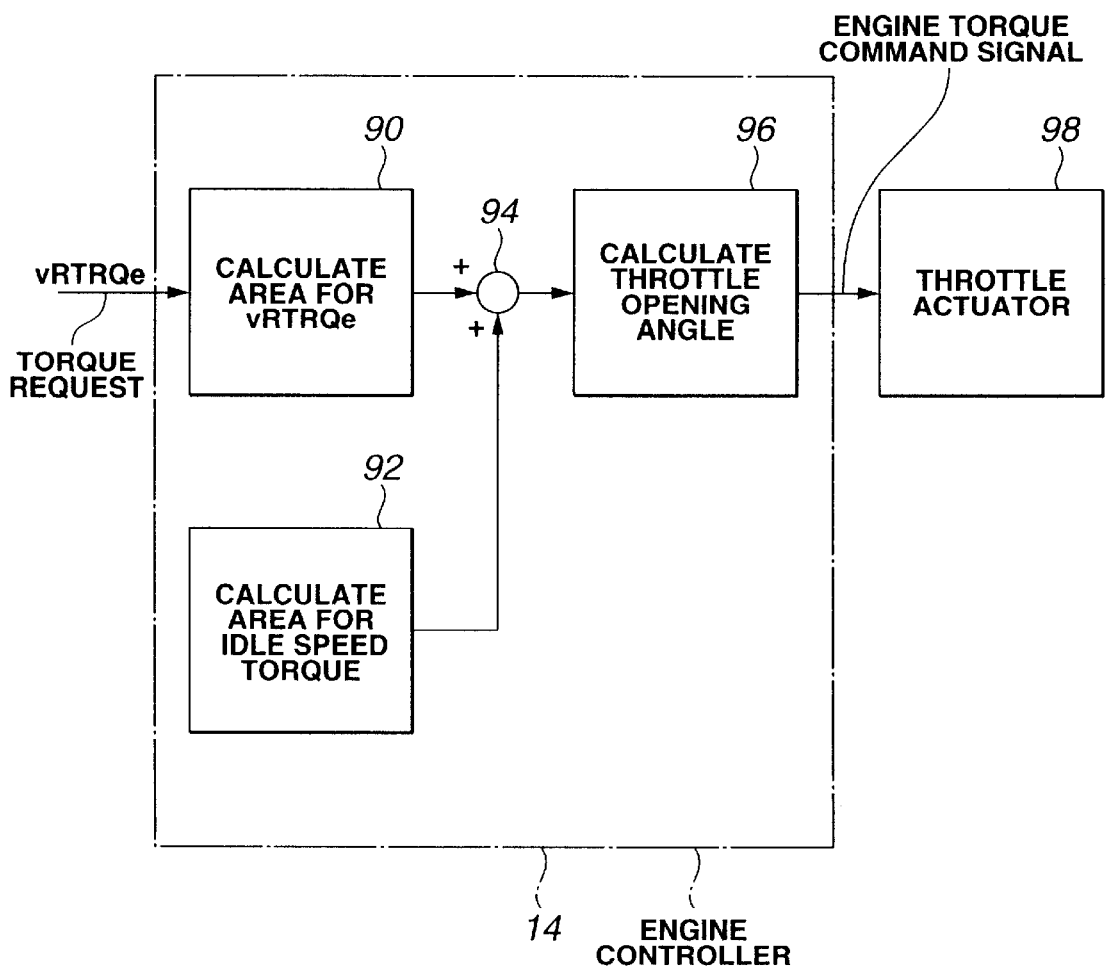
FIG. 6 is a control diagram illustrating an engine controller according to the present invention.
Figure 7:
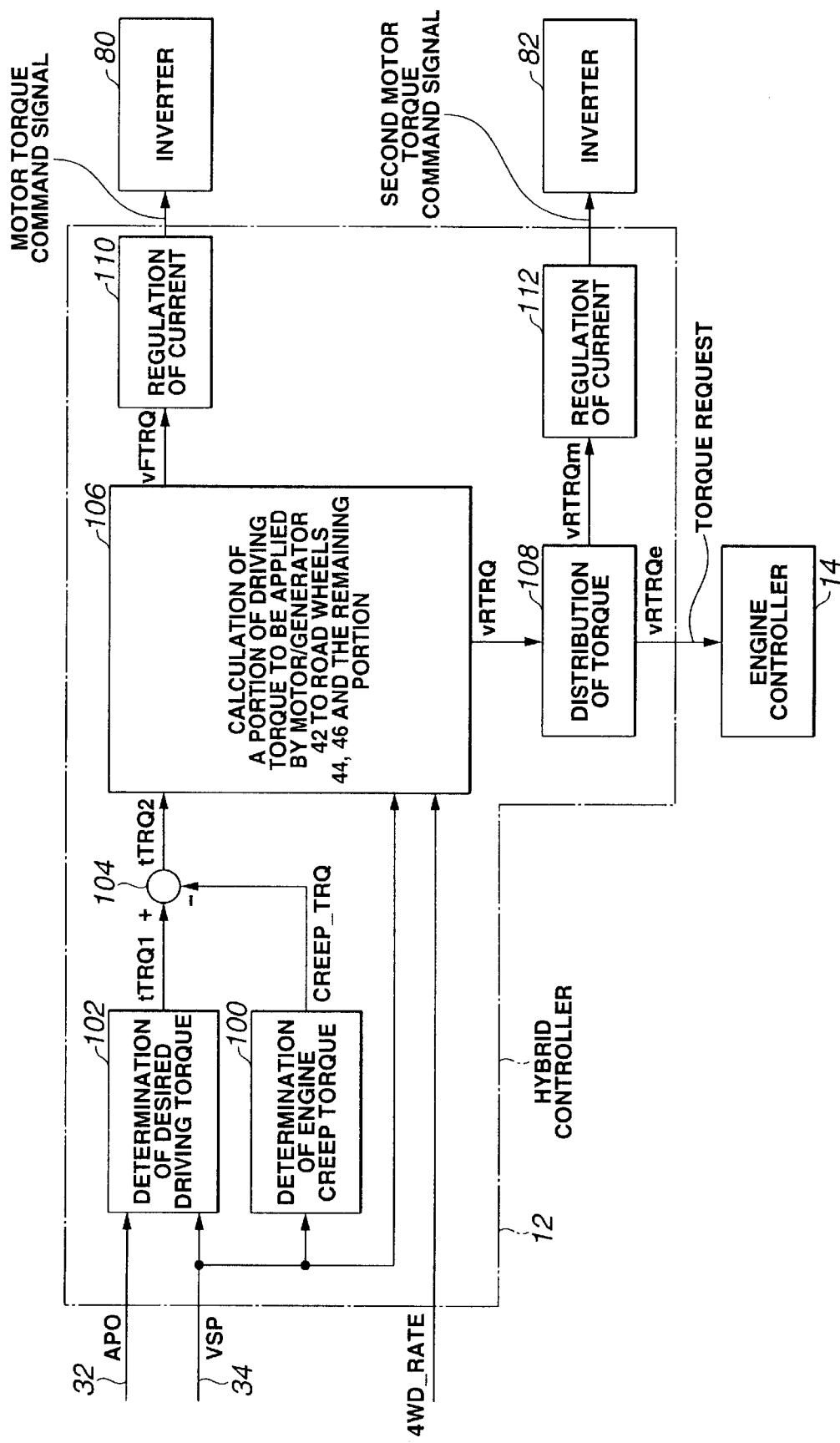
FIG. 7 is a control diagram illustrating a hybrid controller according to the present invention.
Figure 9:
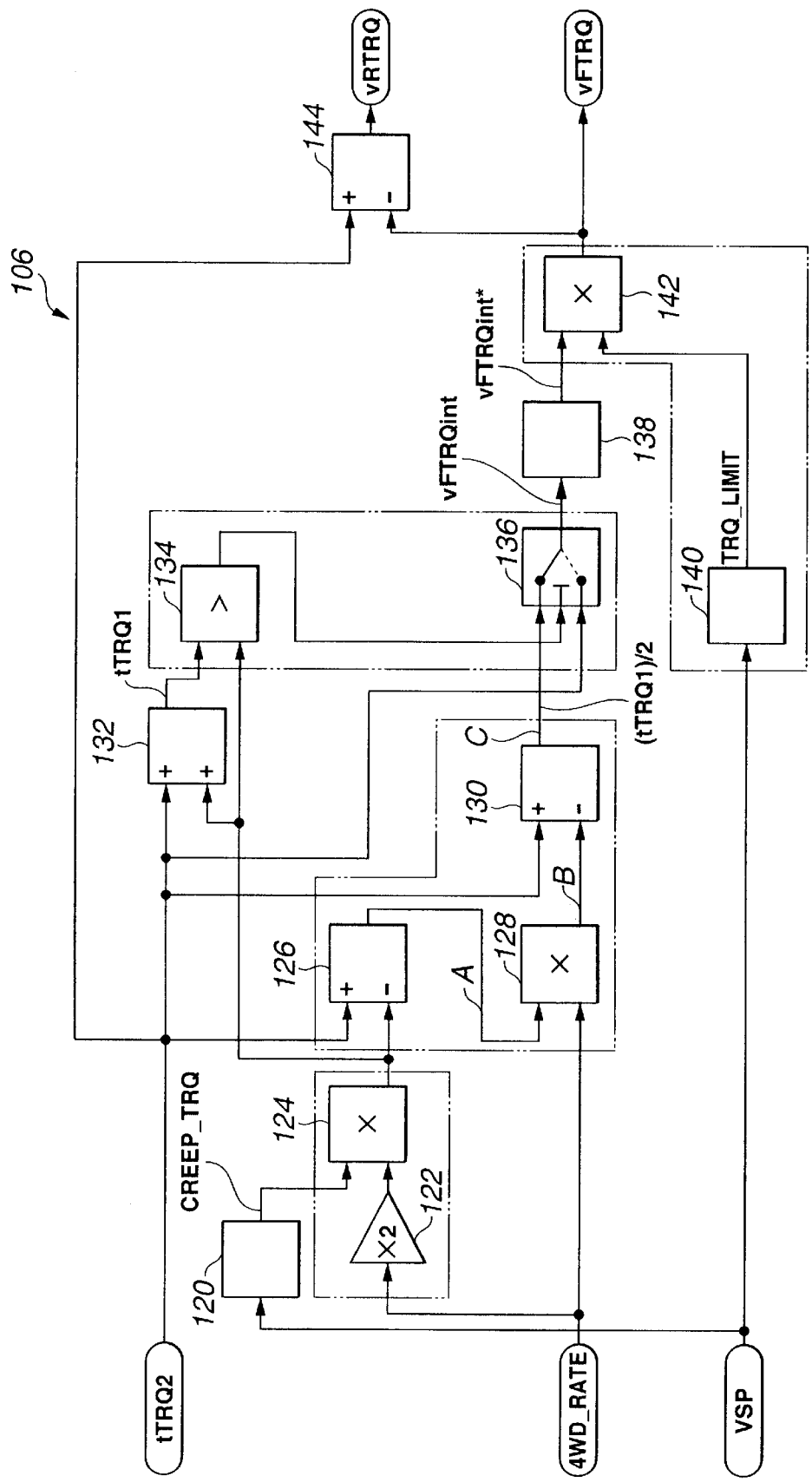
FIG. 9 is a control diagram illustrating a driving torque calculator according to the present invention.

An exemplary embodiment of the present invention can be understood with reference to controls diagrams in FIGS. 6, 7 and 9. In FIG. 6, an engine controller 14 receives a torque request for an engine driving torque vRTRQe. The torque request is used as an input to a block 90. At block 90, controller 14 calculates an airflow area required to provide vRTRQe. At block 92, controller 14 calculates an airflow area required to provide idle speed torque. Blocks 90 and 92 provide the calculated results to a summation point 94. At summation point 94, controller 14 calculates the sum of the two airflow areas and provides it to a block 96. At block 96, controller 14 calculates throttle position or opening angle required to provide the sum of the two airflow areas by using, for example, stored look-up conversion table. Controller 14 generates an engine torque command signal and applies it to a throttle actuator 98 for the engine throttle. In response to the engine torque command signal, throttle actuator 98 adjusts the engine throttle to the throttle position determined at block 96. In this manner, engine controller 14 combines the idle speed torque and the engine torque vRTRQe to generate the engine torque command signal.

Figure 8:
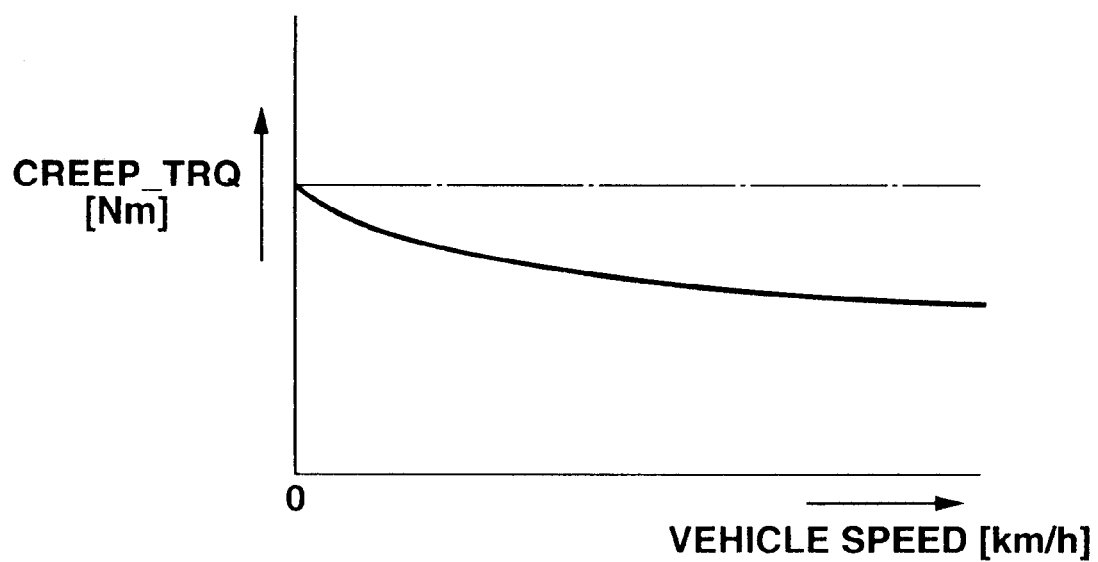
FIG. 8 is a creep torque look-up table, which is used to estimate a creep-torque portion (CREEP_TRQ) of engine torque versus vehicle speed (VSP).

Engine controller 14 is shown as block in FIG. 7. FIG. 7 clearly shows that a hybrid controller 12 is in communication with engine controller 14 through the communication of torque request for driving torque vRTRQe. Accelerator pedal position signal 32, vehicle speed signal 34 and four-wheel drive rate 4WD_RATE are used as inputs. Controller 12 recognizes or determines current accelerator pedal position APO and vehicle speed VSP from signals 32 and 34, respectively. At block 100, controller 12 determines an engine creep torque CREEP_TRQ by retrieving stored look-up table in FIG. 8 using vehicle speed VSP. As seen in FIG. 8, creep torque CREEP_TRQ drops as VSP increases. In FIG. 7, at block 102, controller 12 determines a desired driving torque tTRQ1 for current APO and VSP condition by, for example, using stored look-up map. The desired driving torque tTRQ1 and the creep torque CREEP_TRQ fed to an operation point 104. At point 104, controller 12 calculates the subtract of creep torque CREEP_TRQ from desired driving torque (tTRQ1) to give a modified desired driving torque tTRQ2 (=[tTRQ1]−[CREEP_TRQ]).

A driving torque calculator or calculating block 106 receives, as an input, modified desired driving torque tTRQ2, which is the excess of desired driving torque tTRQ1 over CREEP_TRQ. Another input to block 106 is vehicle speed VSP. The other input to block 106 is four-wheel drive rate 4WD_RATE. At block 106, controller 12 first calculates a portion of desired driving torque tTRQ1 in response to a target level of 4WD_RATE. This portion is motor driving torque vFTRQ to be applied by motor/generator 42 to second set of road wheels 44 and 46. Controller 12 calculates subtract of the motor driving torque vFTRQ from modified desired driving torque tTRQ2 to give a remaining portion. This remaining portion is an engine/motor driving torque vRTRQ to be applied by engine 60 and/or motor/generator 62 to first set of road wheels 38 and 40. Engine/motor driving torque vRTRQ and motor driving torque vFTRQ are fed to blocks 108 and 110, respectively.

At block 108, controller 12 distributes engine/motor driving torque vRTRQ into an engine driving torque vRTRQe and a second motor driving torque vRTRQm. When assist by motor/generator 62 is required, the second motor driving torque vRTRQm becomes greater than zero. When assist by motor/generator 62 is not required, second motor driving torque vRTRQm is zero. Since it is not intended to use such assist, engine driving torque vRTRQe is equal to engine/motor driving torque vRTRQ determined at block 106 for moving vehicle 70 from standstill in 4WD mode. The engine driving torque vRTRQe is communicated, as torque request, to engine controller 14.

At block 110, controller 12 determines control parameters for regulation of current needed to let motor/generator 42 produce motor driving torque vFTRQ and generates a motor torque command signal. At block 112, controller 12 determines control parameters for regulation of current needed to let motor/generator 62 produce second motor driving torque vRTRQm and generates a second motor torque command signal. Controller 12 applies the motor torque command signals to inverters 80 and 82, respectively. Inverter 80 provides three-phase alternate current supplied to motor/generator 42 in response to the motor torque command signal. Inverter 82 provide three-phase alternate current supplied to motor/generator 62 in response to the second motor torque command signal.

FIG. 9 is a block diagram illustrating a driving torque calculator 106 according to the present invention. Driving torque calculator 106 calculates a motor driving torque vFTRQ and an engine/motor driving torque vRTRQ, taking into account a creep torque CREEP_TRQ and a desired driving torque tTRQ1.

Driving torque calculator 106 includes a block 120. Block 120 receives vehicle speed VSP and determines an engine creep torque CREEP_TRQ by retrieving stored look-up table in FIG. 8 using vehicle speed VSP. Block 120 may be eliminated if it is possible to receive the output of the block 100 shown in FIG. 7.

Driving torque calculator 106 includes a functional section for traction control. This functional section receives a target level of four-wheel drive rate 4WD_RATE. In this example, the target level is set to ½ (=50%). The target level is doubled at an operational amplifier 122. The output of operational amplifier 122, which is 1, is provided to a multiplying block 124. The output of block 120 is also provided to block 124. Output of block 124 is creep torque CREEP_TRQ.

Driving torque calculator 106 includes a functional section for calculating a fragment of or a predetermined percentage of desired driving torque tTRQ1 based on the target level of 4WD_RATE. Modified desired driving torque tTRQ2 and creep torque CREEP_TRQ are provided to a subtracting block 126. At block 126, creep torque CREEP_TRQ is subtracted from modified desired driving torque tTRQ2 to give an output A. Output A can be expressed as, $$[\text{Output } A] = tTRQ2 - \text{CREEP\_TRQ} \qquad (3)$$
$$= tTRQ1 - 2 \times \text{CREEP\_TRQ}.$$

Output A and the target level of 4WD_RATE are provided to a multiplying block 128. At block 128, A is multiplied with 4WD_RATE to give an output B. Output B can be expressed as, $$[\text{Output } B] = A \times 4\text{WD\_RATE} \qquad (4)$$
$$= A/2$$
$$= (tTRQ1)/2 - \text{CREEP\_TRQ}.$$

Output B and modified desired driving torque tTRQ2 are provided to a subtracting block 130. At block 130, output B is subtracted from modified desired driving torque tTRQ2 to give an output C. Output C can be expressed as, $$[\text{Output } C] = tTRQ2 - B \qquad (5)$$
$$= (tTRQ1 - \text{CREEP\_TRQ}) -$$
$$[(tTRQ1)/2 - \text{CREEP\_TRQ}]$$
$$= (tTRQ1)/2.$$

Driving torque calculator 106 includes a summing block 132. Block 132 receives modified desired driving torque tTRQ2 and creep torque CREEP_TRQ. At block 132, creep torque CREEP_TRQ is added to modified desired driving torque tTRQ2 to give desired driving torque tTRQ1.

Driving torque calculator 106 includes a functional section for making a shift from Period II to Period III (see FIG. 5). At a comparing block 134, a threshold is established based on creep torque [CREEP_TRQ] and [target level of 4WD_RATE]. The threshold is the product of [CREEP_TRQ] and the reciprocal of [target level of 4WD_RATE] as expressed by equation (2). At block 134, desired driving torque tTRQ1 is compared to the threshold. The output of block 134 is provided to a switch 136. Switch 136 receives modified desired driving torque tTRQ2 and output C. Desired driving torque tTRQ1 is not greater than the threshold during operation within Period II (see FIG. 5). When desired driving torque tTRQ1 is not greater than the threshold, switch 136 takes a position as illustrated by the broken line. Under this condition, modified desired driving torque tTRQ2 is set as an intermediate motor driving torque vFTRQint. When desired driving torque tTRQ1 exceeds the threshold, switch 136 takes a position as illustrated by the fully drawn line. Under this condition, output C is set as the intermediate motor driving torque vFTRQint. Output C represents the fragment of or the predetermined percentage of desired driving torque tTRQ1.

Driving torque calculator 106 includes a functional section for realizing operation during Period IV (see FIG. 5). Intermediate motor driving torque vFTRQint is limited to a predetermined upper limit U_LIMIT of, for example 20 Nm, at a limit criterion block 138, for reason explained before in connection with Period IV. The output of block is indicated by vFTRQint* called a modified intermediate driving torque.

Figure 10:
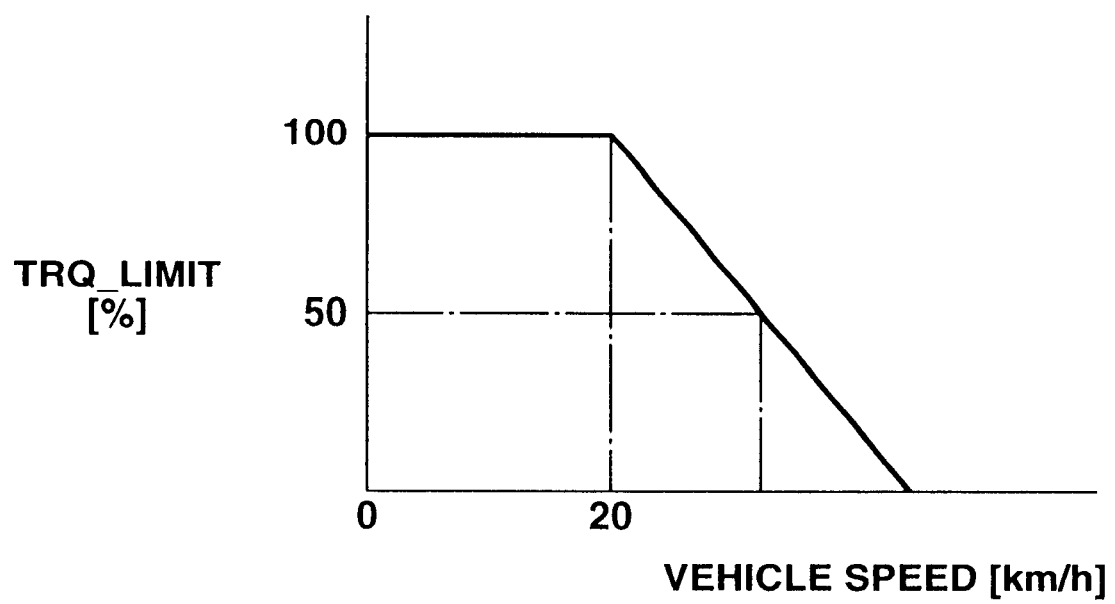
FIG. 10 is a limit criterion (TRQ_LIMIT) look-up table.

Driving torque calculator 106 includes a functional section for realizing operation during Period V (see FIG. 5). A limit criteria block 140 receives vehicle speed VSP to determine a torque limit criterion TRQ_LIMIT from a stored look-up table illustrated in FIG. 10 using VSP. As shown in FIG. 10, torque limit criterion TRQ_LIMIT is 100% until a predetermined condition is fulfilled after starting the vehicle from standstill. In the embodiment, the setting is such that the predetermined condition is fulfilled when the vehicle speed reaches a predetermined speed of 20 Km/h for reason explained before in connection with Period V. After the predetermined condition has been fulfilled, limit criterion TRQ_LIMIT drops toward zero. At another predetermined vehicle speed that is higher than the first mentioned predetermined vehicle speed, torque limit criterion TRQ_LIMIT becomes zero. Returning to FIG. 9, the output (TRQ_LIMIT) of block 140 is provided to a multiplying block 142. Block 142 receives modified intermediate motor driving torque vFTRQint* and multiplies it with torque limit criterion TRQ_LIMIT to give a motor driving torque vFTRQ. In the embodiment, modified intermediate motor driving torque vFTRQint* is equal to unmodified intermediate motor driving torque vFTRQint when the latter does not exceed upper limit U_LIMIT of 20 Nm. At block 142, when upper limit U_LIMIT is not exceeded, it may be regarded as reducing intermediate motor driving torque vFTRQint toward zero upon the predetermined condition being fulfilled after desired driving torque tTRQ1 has exceeded the threshold that is expressed by equation (2).

Driving torque calculator 106 includes a functional section for determining an engine/motor driving torque vRTRQ. Engine/motor driving torque vRTRQ combines with creep torque CREEP_TRQ to make second driving torque applied to first set of road wheels 38 and 40. At subtracting block 144, motor driving torque vFTRQ is subtracted from modified desired driving torque tTRQ2 to give engine/motor driving torque vRTRQ. Engine/motor driving vRTRQ may be expressed as, $$[vRTRQ]=[tTRQ1-CREEP\_TRQ]-vFTRQ \qquad (6).$$

With reference also to FIG. 7, normally, all of engine/motor driving torque vRTRQ is used or set as an engine driving torque vRTRQe during starting the vehicle from standstill.

Figure 11:
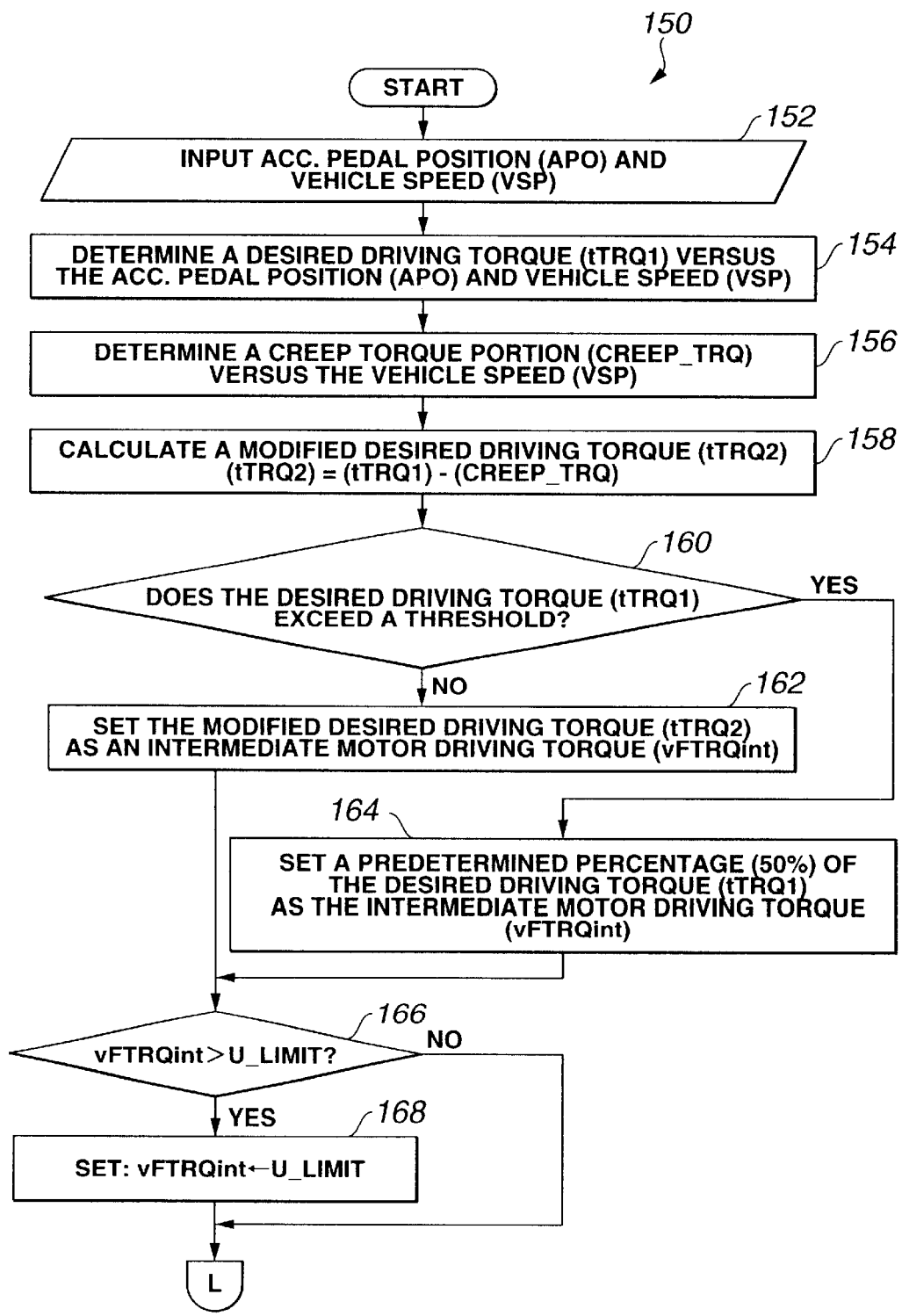
FIGS. 11 and 12 illustrate a flow chart of a control routine implementing the present invention.
Figure 12:
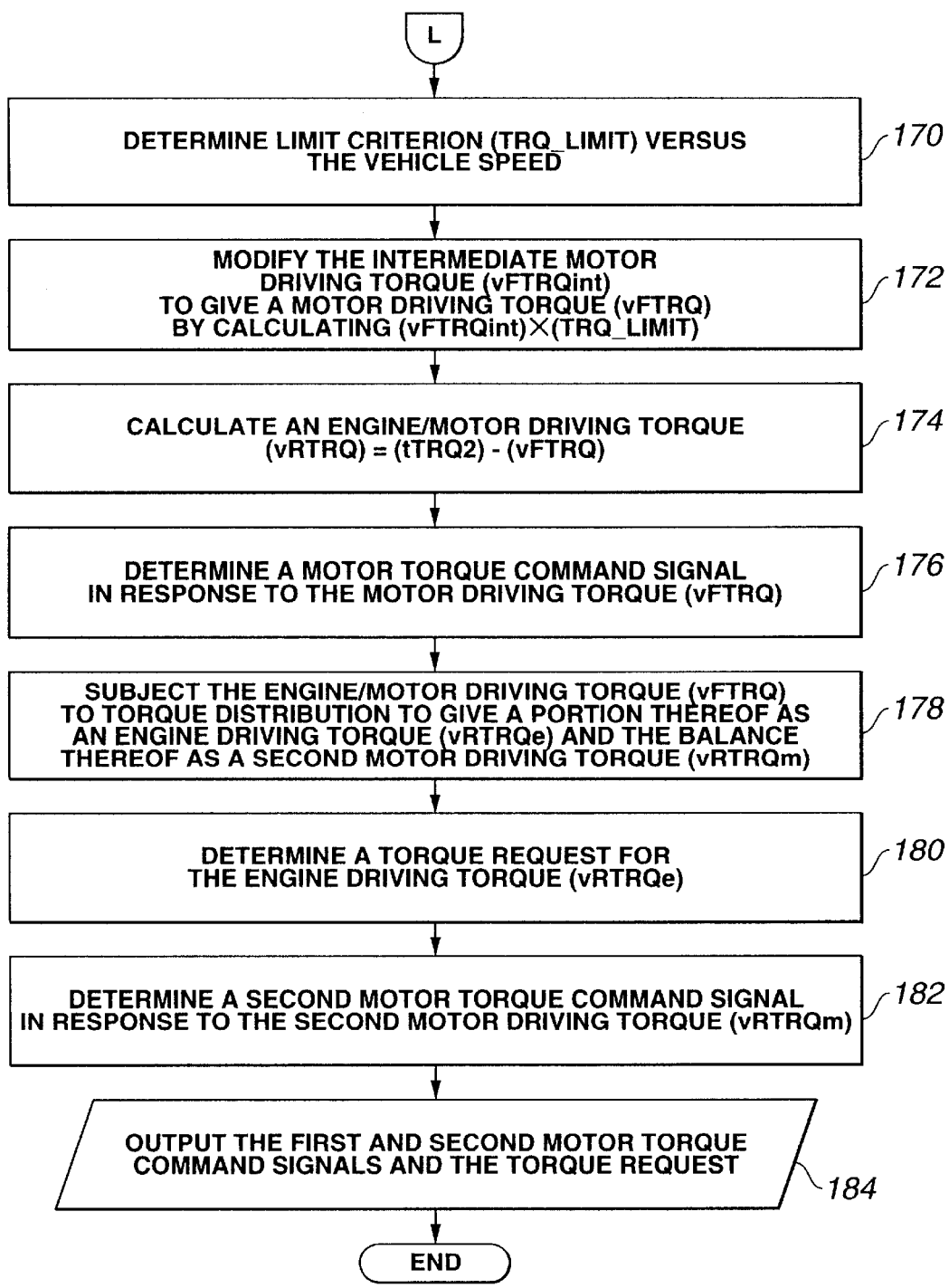

The flow chart in FIGS. 11 and 12 illustrates a control routine 150 of the exemplary implementation of the present invention. At input box 152, the hybrid controller inputs information of: accelerator pedal position APO and vehicle speed VSP.

In box 154, the controller determines a desired driving torque tTRQ1 versus the accelerator pedal APO and the vehicle speed VSP. At box 156, the controller determines a creep torque portion CREEP_TRQ versus the vehicle speed VSP from the stored look-up table in FIG. 8. At box 158, the controller computes a modified desired driving torque tTRQ2 by subtracting the creep torque portion CREEP_TRQ from the desired driving torque tTRQ1.

At an interrogation box 160, the controller establishes a threshold, which is expressed by the equation (2), based on the creep torque portion CREEP_TRQ and a target level of a four-wheel drive rate 4WD_RATE. At box 160, the controller determines whether the desired driving torque tTRQ1 has exceeded the threshold. Initially, during Period II (see FIG. 5), the desired driving torque tTRQ1 is not greater than the threshold so that the routine proceeds from box 160 to box 162. At box 162, the controller uses or sets the modified desired driving torque tTRQ2 as an intermediate motor driving torque vFTRQint. Upon or immediately after a shift from Period II to Period III, the desired driving torque tTRQ1 exceeds the threshold so that the routine proceeds from box 160 to box 164. At box 164, the controller sets or uses a predetermined fragment or percentage (½ or 50%, for example) of the desired driving torque tTRQ1 as the intermediate motor driving torque vFTRQint. This predetermined percentage is the target level of 4WD_RATE. After box 162 or 164, the routine proceeds to interrogation box 166.

At box 166, the controller determines whether the intermediate motor driving torque vFTRQint exceeds an upper limit U_LIMIT (=20 Nm, for example). If this upper limit U_LIMIT is exceeded, the controller limits the intermediate motor driving torque vFTRQint to the upper limit U_LIMIT at box 168. If not, the intermediate motor driving torque vFTRQint is left as it is.

In FIG. 12, at box 170, the controller determines a torque limit criterion TRQ_LIMIT versus the vehicle speed VSP from the stored look-up table illustrated in FIG. 10. At box 172, the controller modifies the intermediate vFTRQint to give a motor driving torque vFTRQ by calculating the product of vFTRQint and TRQ_LIMIT.

At box 172, the controller determines an engine/motor driving torque vRTRQ by calculating subtract of the motor driving torque vFTRQ from the modified desired driving torque tTRQ2.

At box 176, the controller determines a motor torque command signal in response to the motor driving torque vFTRQ.

At box 178, the controller divides the engine/motor driving torque vFTRQ into a portion used as an engine driving torque vRTRQe and the balance used as a second motor driving torque vRTRQm.

At box 180, the controller determines a torque request for the engine driving torque vRTRQe. At box 182, the controller determines a second motor torque command signal in response to the second motor driving torque vRTRQm.

At output box 184, the controller outputs the first and second motor torque command signals for application to inverters 80 and 82 (see FIG. 7) and outputs the torque request to an engine controller 14.

Figure 13:
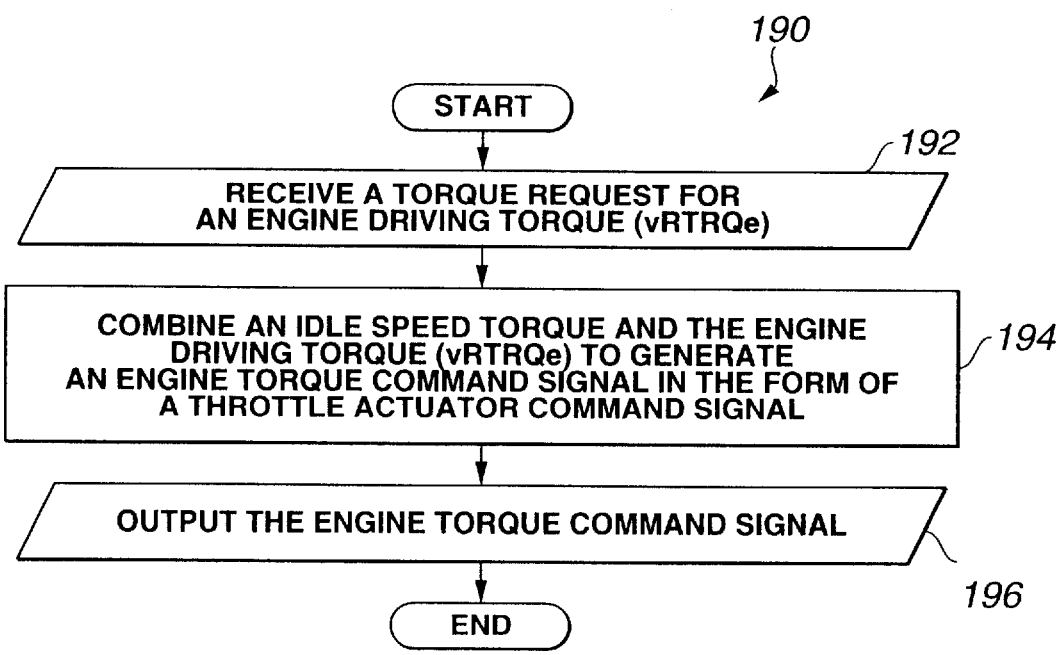
FIG. 13 is a flow chart of a control routine implementing the present invention.

The flow chart in FIG. 13 illustrates a control routine 190 of the exemplary implementation of the present invention. At input box 192, the engine controller inputs the torque request for the engine driving torque vRTRQe from the hybrid controller.

At box 194, the controller combines an idle speed torque and the engine driving torque vRTRQe to generate an engine torque command signal in the form of a throttle actuator command signal.

At output box 196, the controller outputs the engine torque command signal.

Figure 14:
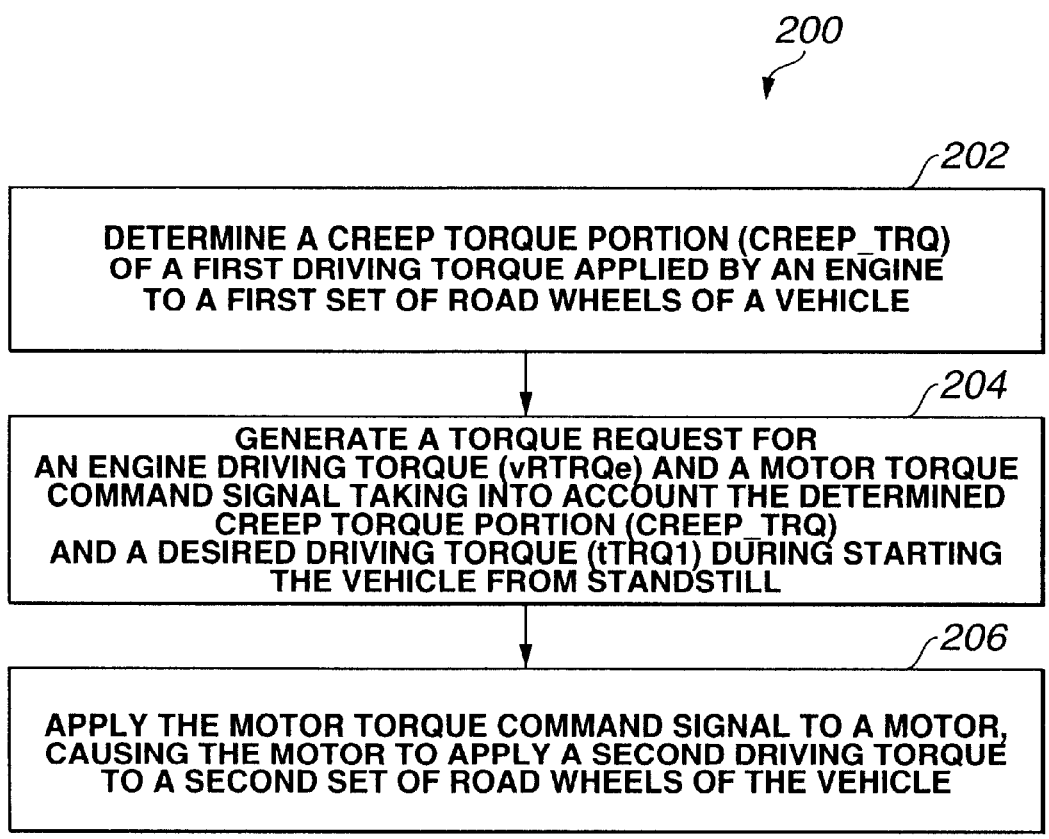
FIG. 14 is a flow diagram illustrating control logic of one embodiment of a hybrid system and a control method for a vehicle according to the present invention.

Referring to FIG. 14, a flow diagram illustrates control logic, generally indicated at 200, of one exemplary embodiment of a hybrid system and a control method according to the present invention. As will be appreciated by one or ordinary skill in the art, the flow diagram illustrated in FIG. 14 may represent any of a number of known processing strategies such as event-driven, interrupt-driven, multi-tasking, multi-treating, and the like. As such, various steps or functions illustrated may be performed in the sequence illustrated, or in parallel. The order of processing is provided for ease of illustration and description, only. Preferably, the control logic is implemented in software, which is executed by a microprocessor-based controller. Of course, the control logic may be implemented in software, hardware, or a combination of software and hardware. The flow diagram of FIG. 14 illustrates one "loop" and its operations are preferably repeated at predetermined time intervals as known by those skilled in the art.

In FIG. 14, block 202 represents determining a creep torque portion CREEP_TRQ of a first driving torque applied by an engine 60 (see FIG. 2) to a first set of road wheels 38 and 40 of a vehicle 70. Block 204 represents generating a torque request for an engine driving torque vRTRQe and a motor torque command signal taking into account the determined creep torque portion CREEP_TRQ and a desired driving torque tTRQ1 during starting the vehicle from standstill. Block 206 represents applying the motor torque command signal to a motor/generator 42 (see FIG. 2), causing the motor/generator to apply a second driving torque to a second set of road wheels 44 and 46 of the vehicle 70.

From the previous description on FIG. 9, it is clear that the hybrid controller uses or sets the modified desired driving torque tTRQ2 as the intermediate motor driving torque vFTRQint when the desired driving torque tTRQ1 is not greater than the threshold. Accordingly, the engine/motor driving torque vRTRQ is zero (see block 144), allowing the creep torque portion alone to move the first set of road wheels 38 and 40.

While the present invention has been particularly described, in conjunction with exemplary embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. P2001-245173, filed Aug. 13, 2001, the disclosure of which is hereby incorporated by reference in its entirety.

What is claimed is:

1. A hybrid system for a vehicle having a first set of road wheels and a second set of road wheels, comprising:
   an engine controller for receiving a torque request for an engine driving torque (vRTRQe) and combining an idle speed torque and the engine driving torque (vRTRQe) to generate an engine torque command signal;
   an engine drivingly coupled with the first set of road wheels to apply a first driving torque to the first set of road wheels in response to the engine torque command signal;
   a hybrid controller, in communication with the engine controller, for generating the torque request and a motor torque command signal taking into account a creep torque portion (CREEP_TRQ) of the first driving torque applied to the first set of road wheels and a desired driving torque (tTRQ1) during starting the vehicle from standstill; and
   a motor drivingly coupled with the second set of road wheels to apply a second driving torque to the second set of road wheels in response to the motor torque command signal.

2. The hybrid system as claimed in claim 1, wherein the hybrid controller determines a vehicle speed (VSP) to determine the creep torque portion (CREEP_TRQ).

3. The hybrid system as claimed in claim 2, wherein the hybrid controller determines the desired driving torque (tTRQ1) versus the vehicle speed (VSP) and operator demand (APO) condition.

4. The hybrid system as claimed in claim 3, wherein the hybrid controller includes a map that contains various values of the desired driving toque (tTRQ1) versus different actual vehicle speed (VSP) and operator demand (APO) conditions.

5. The hybrid system as claimed in claim 4, wherein the operator demand is represented by an accelerator pedal position (APO).

6. The hybrid system as claimed in claim 1, wherein the hybrid controller sets or uses a predetermined fragment of the desired driving torque (tTRQ1) as an intermediate motor driving torque (vFTRQint) when and after the desired driving torque (tTRQ1) exceeds a threshold established based on the creep torque portion (CREEP_TRQ), reducing the intermediate motor driving torque (vFTRQint) toward zero to give a motor driving torque (vFTRQ) upon a predetermined condition being fulfilled after the desired driving torque (tTRQ1) exceeded the threshold, and determines the motor torque command signal in response to the motor driving torque (vFTRQ).

7. The hybrid system as claimed in claim 6, wherein the hybrid controller determines that the predetermined condition has been fulfilled when the vehicle speed exceeds a predetermined upper limit speed.

8. The hybrid system as claimed in claim 6, wherein the hybrid controller subtracts the creep torque portion (CREEP_TRQ) from the desired driving torque (tTRQ1) to give a modified desired driving torque (tTRQ2), subtracts the motor driving torque (vFTRQ) from the modified desired driving torque (tTRQ2) to give an engine/motor driving torque (vRTRQ), sets at most the engine/motor driving torque (vRTRQ) as the engine driving torque (vRTRQe), and applies the torque request for the engine driving torque (vRTRQe) to the engine controller.

9. The hybrid system as claimed in claim 8, further comprising a second motor drivingly coupled with the first set of road wheels to apply a third driving torque to the first set of road wheels in response to a second motor torque command signal, and wherein the hybrid controller sets at least a portion of the engine/motor driving torque (vRTRQ) as the engine driving torque (vRTRQe), sets the balance of the engine/motor driving torque (vRTRQ) as a second motor driving torque, and generates the second motor torque command signal in response to the second motor driving torque (vRTRQm).

10. The hybrid system as claimed in claim 8, wherein the predetermined fragment of the desired driving torque (tTRQ1) is a predetermined percentage of the desired driving torque (tTRQ1).

11. The hybrid system as claimed in claim 10, wherein the hybrid controller sets the modified desired driving torque (tTRQ2) as the intermediate motor driving torque (vFTRQint) when the desired driving torque (tTRQ1) is not greater than the threshold, whereby the engine/motor driving torque (vRTRQ) is zero, allowing the creep torque portion alone to move the first set of road wheels of the vehicle.

12. The hybrid system as claimed in claim 1, wherein, as the desired driving torque (tTRQ1) increases after exceeding a threshold established based on the creep torque portion (CREEP_TRQ) during starting the vehicle from standstill, the hybrid controller regulates the motor to increase the second driving torque applied to the second set of road wheels in proportional relationship to the desired driving torque (tTRQ1) to move the vehicle in cooperation with the creep torque portion (CREEP_TRQ).

13. The hybrid system as claimed in claim 1, wherein, as the desired driving torque (tTRQ1) increases after exceeding a threshold established based on the creep torque portion (CREEP_TRQ) during starting the vehicle from standstill, the hybrid controller regulates the motor to increase the second driving torque applied to the second set of road wheels in proportional relationship to the desired driving torque (tTRQ1) to move the vehicle in cooperation with the creep torque portion applied to the first set of road wheels until the second driving torque applied to the second set of road wheels matches a predetermined relationship with the creep torque portion (CREEP_TRQ).

14. The hybrid system as claimed in claim 13, wherein the hybrid controller determines that the second driving force applied to the second set of road wheels matches the predetermined relationship with the creep torque portion (CREEP_TRQ) when the second driving force applied to the second set of road wheels is as high as the creep torque portion (CREEP_TRQ) applied to the first set of road wheels.

15. The hybrid system as claimed in claim 14, wherein, as the desired driving torque increases further after the second driving torque applied to the second set of road wheels has matched the predetermined relationship with the creep torque portion (CREEP_TRQ), the hybrid controller regulates the motor and causes the engine controller to control the engine such that the second driving torque applied to the second set of road wheels is one half the desired driving torque and the first driving torque applied to the first set of road wheels is the remainder of the desired driving torque.

16. The hybrid system as claimed in claim 1, wherein, when the desired driving torque (tTRQ1) is not greater than a threshold established based on the creep torque portion (CREEP_TRQ), the hybrid controller regulates the motor and causes the engine controller to control the engine such that, with the second driving torque applied to the second set of road wheels being zero, only the creep torque portion (CREEP_TRQ) is applied to the first set of road wheels.

17. The hybrid system as claimed in claim 15, wherein the hybrid controller limits the second driving torque applied by the motor to the second set of road wheels to an upper limit that has been set taking into account the efficiency with which the motor operates.

18. The hybrid system as claimed in claim 15, wherein, as the vehicle speed increases after exceeding a predetermined upper limit speed, the hybrid controller causes the motor to reduce the second driving torque applied to the second set of road wheels toward zero.

19. The hybrid system as claimed in claim 1, further comprising a hydrokinetic unit provided to hydraulically engage the engine to the first set of road wheels.

20. The hybrid system as claimed in claim 1, further comprising a torque converter provided to hydraulically engage the engine to the first set of road wheels.

21. The hybrid system as claimed in claim 1, wherein the first set of road wheels is a set of rear road wheels, and the second set of road wheels is a set of front road wheels.

22. The hybrid system as claimed in claim 1, wherein the first set of road wheels is a set of front road wheels, and the second set of road wheels is a set of rear road wheels.

23. A method for controlling a vehicle having a first set of road wheels, a second set of road wheels and a drivetrain, the drivetrain including an engine drivingly coupled with the first set of road wheels to apply a first driving torque to the first set of road wheels in response to an engine torque command signal, and a motor drivingly coupled with the second set of road wheels to apply a second driving torque to the second set of road wheels in response to a motor torque command signal, the control method comprising:
  receiving a torque request for an engine driving torque and combining an idle speed torque and the engine driving torque to generate the engine torque command signal; and
  generating the torque request and the motor torque command signal taking into account a creep torque portion (CREEP_TRQ) of the first driving torque applied to the first set of road wheels and a desired driving torque (tTRQ1) during starting the vehicle from standstill.

24. A hybrid system for a vehicle having a first set of road wheels and a second set of road wheels, comprising:
  first controller means for receiving a torque request for an engine driving torque (vTRQe) and combining an idle speed torque and the engine driving torque (vTRQe) to generate an engine torque command signal;
  an engine drivingly coupled with the first set of road wheels to apply a first driving torque to the first set of road wheels in response to the engine torque command signal;
  second controller means, in communication with the first controller means, for generating the torque request and a motor torque command signal taking into account a creep torque portion (CREEP_TRQ) of the first driving torque applied to the first set of road wheels and a desired driving torque (tTRQ1) during starting the vehicle from standstill; and
  a motor drivingly coupled with the second set of road wheels to apply a second driving torque to the second set of road wheels in response to the motor torque command signal.

25. A method for controlling a vehicle having a first set of road wheels, a second set of road wheels and a drivetrain, the drivetrain including an engine drivingly coupled with the first set of road wheels to apply a first driving torque to the first set of road wheels in response to an engine torque command signal, and a motor drivingly coupled with the second set of road wheels to apply a second driving torque to the second set of road wheels in response to a motor torque command signal, the control method comprising:
  determining a desired driving torque (tTRQ1);
  determining a creep torque portion (CREEP_TRQ) of the first driving torque applied to the first set of road wheels;
  comparing the desired driving torque (tTRQ1) to a threshold established based on the creep torque portion (CREEP_TRQ);
  subtracting the creep torque portion (CREEP_TRQ) from the desired driving torque (tTRQ1) to give a modified desired driving torque (tTRQ2);
  setting the modified desired driving torque (tTRQ2) as an intermediate motor driving torque (vFTRQint) when the desired driving torque (tTRQ1) is not greater than the threshold;
  setting a predetermined percentage of the desired driving torque (tTRQ1) as the intermediate motor driving torque (vFTRQint) when the desired driving torque (tTRQ1) exceeds the threshold;
  reducing the intermediate motor driving torque (vFTRQint) toward zero to give a motor driving torque (vFTRQ) upon a predetermined condition being fulfilled after starting the vehicle;
  subtracting the motor driving torque (vFTRQ) from the modified desired engine torque (tTRQ2) to give an engine/motor driving torque (vRTRQ);
  determining the motor torque command signal in response to the motor driving torque (vFTRQ); and
  determining the engine torque command signal in response to the engine/motor driving torque (vRTRQ).

26. A computer readable storage medium having stored therein data representing instructions executable by a computer to control a vehicle having a first set of road wheels, a second set of road wheels and a drivetrain, the drivetrain including an engine drivingly coupled with the first set of road wheels to apply a first driving torque to the first set of road wheels in response to an engine torque command signal, and a motor drivingly coupled with the second set of road wheels, the computer readable storage medium comprising:
  instructions for determining a creep torque portion (CREEP_TRQ) of the first driving torque applied to the first set of road wheels;

instructions for generating a torque request for an engine driving torque (vRTRQe) and a motor torque command signal taking into account the determined creep torque portion (CREEP_TRQ) and a desired driving torque (tTRQ1) during starting the vehicle from standstill; and instructions for applying the motor torque command signal to the motor, causing the motor to apply a second driving torque to the second set of road wheels.

* * * * *